United States Patent
Wachter et al.

(10) Patent No.: US 10,110,090 B2
(45) Date of Patent: Oct. 23, 2018

(54) DRIVE ARRANGEMENT FOR AUXILIARY UNITS IN THE MOTOR VEHICLE SECTOR

(71) Applicant: Dr. Ing. h.c. F. Porsche Aktiengesellschaft, Stuttgart (DE)

(72) Inventors: Sebastian Wachter, Pressig (DE); Joachim Kappich, Weil der Stadt (DE); Ulrich Weingart, Illingen (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 272 days.

(21) Appl. No.: 14/956,454

(22) Filed: Dec. 2, 2015

(65) Prior Publication Data

US 2016/0159215 A1   Jun. 9, 2016

(30) Foreign Application Priority Data

Dec. 4, 2014 (DE) .................. 10 2014 117 835

(51) Int. Cl.
| | |
|---|---|
| H02K 7/108 | (2006.01) |
| H02K 7/116 | (2006.01) |
| B60K 25/00 | (2006.01) |
| F16H 1/22 | (2006.01) |
| F16H 1/28 | (2006.01) |

(52) U.S. Cl.
CPC ............ *H02K 7/108* (2013.01); *H02K 7/116* (2013.01); *B60K 25/00* (2013.01); *B60K 2025/005* (2013.01); *B60Y 2300/51* (2013.01); *F16H 1/22* (2013.01); *F16H 1/28* (2013.01)

(58) Field of Classification Search
CPC ................................ H02K 7/108; H02K 7/116
USPC .......................................................... 310/78
IPC ............................................. H02K 7/108,7/116
See application file for complete search history.

(56) References Cited

U.S. PATENT DOCUMENTS

| | | | |
|---|---|---|---|
| 6,048,288 A | 4/2000 | Tsujii et al. | |
| 6,845,832 B2 * | 1/2005 | Takizawa | B60K 6/365 180/53.8 |
| 8,591,360 B2 * | 11/2013 | Kawasaki | B60K 6/48 475/210 |
| 8,770,327 B2 * | 7/2014 | Yamada | B60K 6/383 180/65.22 |
| 8,863,618 B2 * | 10/2014 | Kubo | B60K 6/48 74/661 |
| 8,876,656 B2 * | 11/2014 | Erjawetz | B60K 25/00 477/8 |

(Continued)

FOREIGN PATENT DOCUMENTS

| | | |
|---|---|---|
| DE | 195 14 929 | 11/1996 |
| DE | 698 31 049 | 7/2006 |
| DE | 10 2007 061 417 | 6/2009 |

OTHER PUBLICATIONS

German Search Report dated Oct. 6, 2015.
Chinese Office Action dated Sep. 18, 2017.

*Primary Examiner* — John K Kim
(74) *Attorney, Agent, or Firm* — Gerald E. Hespos; Michael J. Porco; Matthew T. Hespos

(57) ABSTRACT

A drive arrangement for auxiliary units in a motor vehicle has a control unit and an electric drive unit that is connected via a transmission arrangement to at least one auxiliary unit. An electric drive unit (8) is connected in terms of drive to at least two auxiliary units (4, 6) by drive trains (12, 16) of a transmission arrangement (10). Clutch members (22, 24) for coupling or decoupling the auxiliary units (4, 6) in terms of drive are provided in the respective drive trains (12, 14).

3 Claims, 1 Drawing Sheet

(56) References Cited

U.S. PATENT DOCUMENTS

| | | | |
|---|---|---|---|
| 9,151,221 B2* | 10/2015 | Endo | F02B 67/00 |
| 2003/0094317 A1 | 5/2003 | Takizawa et al. | |
| 2008/0203841 A1* | 8/2008 | Horst | H02K 99/20 |
| | | | 310/93 |
| 2012/0129651 A1 | 5/2012 | Erjawetz et al. | |
| 2012/0266701 A1* | 10/2012 | Yamada | B60K 6/383 |
| | | | 74/15.82 |
| 2012/0277060 A1 | 11/2012 | Kubo et al. | |
| 2013/0006460 A1 | 1/2013 | Endo et al. | |
| 2016/0159215 A1* | 6/2016 | Wachter | B60K 25/00 |
| | | | 310/78 |

* cited by examiner

DRIVE ARRANGEMENT FOR AUXILIARY UNITS IN THE MOTOR VEHICLE SECTOR

CROSS REFERENCE TO RELATED APPLICATION

This application claims priority under 35 USC 119 to German Patent Appl. No. 10 2014 117 835.1 filed on Dec. 4, 2014, the entire disclosure of which is incorporated herein by reference.

BACKGROUND

1. Field of the Invention

The invention relates to a drive arrangement for auxiliary units in the motor vehicle sector, having a control unit and an electric drive unit that is connected via a transmission arrangement to at least one auxiliary unit.

2. Description of the Related Art

Drive arrangements of the type mentioned above kind are well known from the prior art. For example, DE 10 2007 061 417 A1 discloses an electric drive unit for a compressed air compressor in a hybrid drive for a motor vehicle. The auxiliary units of hybrid or electric vehicles are allocated an electric drive unit since an internal combustion engine is not in operation or not continuously in operation and consequently cannot drive the auxiliary units conventionally.

The allocation of an electric drive unit necessitates power electronics for each of the auxiliary units. Moreover, the auxiliary units require a larger installation space due to the electric drive unit. In addition, the support and installation of the auxiliary units in the engine compartment is more complex and more expensive.

It is an object of the invention to provide a drive arrangement for auxiliary units that can be embodied and installed in a particularly simple and low-cost way.

SUMMARY

The invention relates to an electric drive unit that is connected in terms of drive to at least two auxiliary units by drive trains of a transmission arrangement. Clutch members are provided in the respective drive trains for coupling or decoupling the auxiliary units in terms of drive. It is thereby possible in a particularly simple manner to save components and installation space, while it is also possible to decouple the entire system vibrationally in a simple manner. Moreover, a common system of this kind can also be encapsulated acoustically more easily.

The clutch members may be designed as freewheel clutches. Thus, it is possible in a particularly simple way to switch the auxiliary unit on and off in accordance with the respective direction of rotation of the drive shaft in a drive train.

The drive train may be a double spur wheel mechanism where one drive train for one auxiliary unit is designed as a spur wheel mechanism with a first gearwheel that is allocated to the electric drive unit, and with a second gearwheel that is allocated to the auxiliary unit. As an alternative, a belt drive is also possible.

In a second embodiment, the transmission arrangement is designed as a planetary mechanism where one drive train is designed as a sun wheel/annulus train and at least one drive train is designed as a sun wheel/planet wheel train. The planet wheels may be coupled to one another by a planet carrier.

Two auxiliary units may be provided. In this case, the first auxiliary unit can be an air-conditioning compressor and the second auxiliary unit can be an air spring compressor. Both auxiliary units require similar electric drive units. The air spring compressor need only be operated briefly to adapt the running gear of a motor vehicle. In these periods, the air-conditioning compressor can be switched off, the thermal mass of an air-conditioning system is sufficiently great to compensate for such a short-term outage.

The invention is explained in greater detail below by means of a drawings.

DETAILED DESCRIPTION

Figure 1:
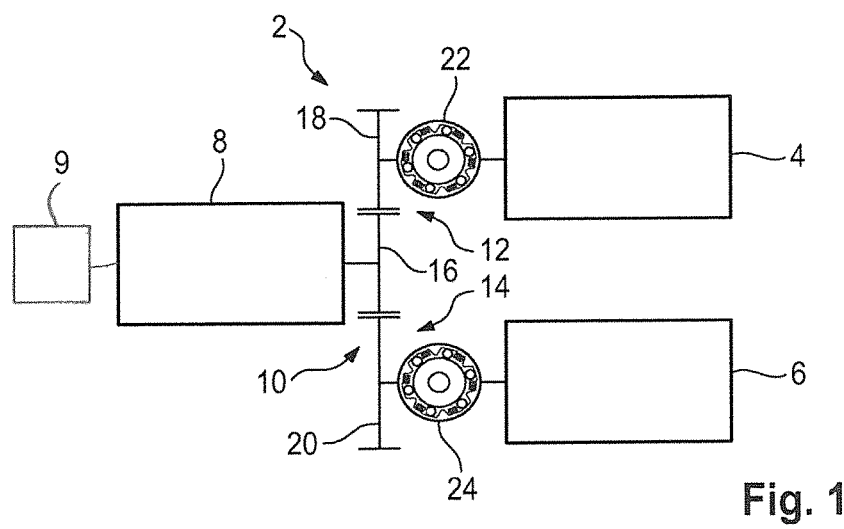
FIG. 1 is a schematic view of a first embodiment of the drive arrangement according to the invention.

FIG. 1 shows a first embodiment of a drive arrangement 2 according to the invention for an air-conditioning compressor 4 and an air spring compressor 6 as auxiliary units in schematic view. For this purpose, the drive arrangement 2 has an electric drive unit 8 that is allocated a control unit 9. The electric drive unit 8 is connected in terms of drive to the auxiliary units 4, 6 by a transmission arrangement 10. The drive arrangement 2 is characterized in that two drive trains 12, 14 of the transmission arrangement 10 are provided and are operatively connected to the two auxiliary units 4, 6, respectively. The transmission arrangement 10 is designed for this purpose as a double spur wheel mechanism, where the first drive train 12 for the air-conditioning compressor 4 is designed as a spur wheel mechanism with a first gearwheel 16 and a second gearwheel 18. The first gearwheel 16 is allocated to the electric drive unit 8, and the second gearwheel 18 is allocated to the air-conditioning compressor 4. The second drive train 14 likewise has the gearwheel 16 and has a second gearwheel 20 allocated to the air compressor 6.

A first clutch member 22 is provided in the drive train 12 for the air conditioning compressor 4, and preferably is a freewheel clutch with a clockwise action. The second drive train 14 further has a second clutch member 24, that preferably is a freewheel clutch with a counterclockwise action. Normally, the electric drive unit 8 rotates counterclockwise, i.e. to the left, as a result of which the second gearwheel 18 is driven clockwise, and consequently the freewheel with the clockwise action locks, thereby driving the air-conditioning compressor 4. During this process, the freewheel of freewheel clutch 24 with the counterclockwise action is released. As a result, the air compressor 6 is not driven. When the electric drive unit 8 rotates clockwise, i.e. to the right, the second gearwheel 20 is driven counterclockwise. As a result, the freewheel with the counterclockwise action of freewheel clutch 24 locks, and the air compressor 6 is driven, while the air-conditioning compressor 4 is decoupled. During the decoupling of the air-conditioning compressor 4, the air-conditioning requirements of the motor vehicle can continue to be met since the thermal mass of an air-conditioning system is sufficiently large.

Figure 2:
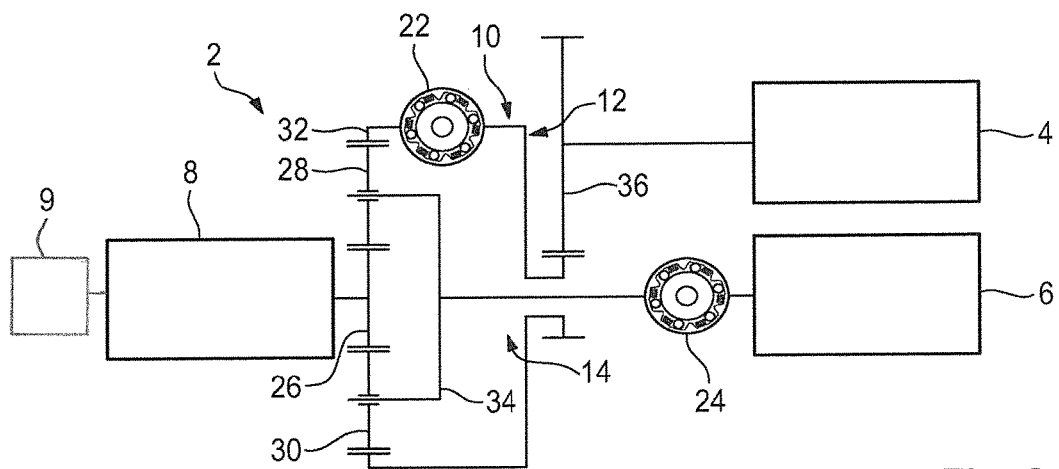
FIG. 2 is a second embodiment of the drive arrangement.

FIG. 2 schematically shows a second embodiment of the invention. In this case, the transmission arrangement 10 with the two drive trains 12, 14 is designed as a planetary mechanism. The first drive train 12 is designed as a sun wheel/annulus train and the second drive train 14 is designed as a sun wheel/planet wheel train. For this purpose, a sun wheel 26 in the first drive train 12 is connected operatively by planet wheels 28, 30 to an annulus 32, which, in turn, is allocated to the air-conditioning compressor 4. The second drive train 14 is formed by a combination of the sun wheel 26 with the planet wheels 28, 30, which are connected operatively to one another by a planet carrier 34 and allocated to the air compressor 6. The special arrangement of freewheel clutch 22 in the first drive train 12 behind the annulus 32 and a driving gearwheel 36 of the air-conditioning compressor 4 enables the use two freewheel clutches 22, 24 with a counterclockwise action to drive the air-conditioning compressor 4 (drive unit rotating counterclockwise) or the air compressor 6 (drive unit rotating clockwise) when the electric drive unit 8 rotates.

It should be clear that the invention is not restricted to the embodiments shown. Attachment of a larger number of auxiliary units is also conceivable.

What is claimed is:

1. A drive arrangement for auxiliary units in a motor vehicle, comprising:
    a control unit;
    an electric drive unit operatively controlled by the control unit for selective rotation in either of opposite first and second rotational directions in response to controls from the control unit;
    a transmission arrangement having first and second drive trains driven by the electric drive unit;
    an air-conditioning compressor and an air spring compressor respectively connected in terms of drive to the first and second drive trains of the transmission arrangement; and
    first and second freewheel clutch members provided in the respective first and second drive trains and being configured so that:
    rotation of the electric drive unit in the first rotational direction causes the first freewheel clutch to be coupled in terms of drive to the air-conditioning compressor and to be decoupled in terms of drive to the air spring compressor; and so that:
    rotation of the electric drive unit in the second rotational direction causes the second freewheel clutch to be coupled in terms of drive to the air spring compressor and to be decoupled in terms of drive to the air-conditioning compressor.

2. A drive arrangement for auxiliary units in a motor vehicle, comprising:
    a control unit;
    an electric drive unit operatively controlled by the control unit for selective rotation in either of opposite first and second rotational directions in response to controls from the control unit;
    a transmission arrangement having first and second drive trains driven by the electric drive unit;
    first and second auxiliary units respectively connected in terms of drive to the first and second drive trains of the transmission arrangement; and
    first and second freewheel clutch members provided in the respective first and second drive trains and being configured so that:
    rotation of the electric drive unit in the first rotational direction causes the first freewheel clutch to be coupled in terms of drive to the first auxiliary unit and to be decoupled in terms of drive to the second auxiliary unit; and so that:
    rotation of the electric drive unit in the second rotational direction causes the second freewheel clutch to be coupled in terms of drive to the second auxiliary unit and to be decoupled in terms of drive to the first auxiliary unit, wherein
    the transmission arrangement comprises a double spur wheel mechanism, the first drive train including a first spur wheel mechanism with a first gearwheel allocated to the first auxiliary unit, and the second drive train including a second spur wheel mechanism with a second gearwheel allocated to the second auxiliary unit.

3. The drive arrangement of claim 2, wherein the first auxiliary unit is an air-conditioning compressor and the second auxiliary unit is an air spring compressor.

* * * * *